(12) United States Patent
Sakai et al.

(10) Patent No.: US 6,989,070 B2
(45) Date of Patent: Jan. 24, 2006

(54) LASER WELDING METHOD

(75) Inventors: Tomohiro Sakai, Obu (JP); Masami Hirata, Obu (JP); Kanehiro Fukaya, Obu (JP); Hideo Nakamura, Toyota (JP)

(73) Assignees: Aisan Kogyo Kabushiki Kaisha, Obu (JP); Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 10/411,149

(22) Filed: Apr. 11, 2003

(65) Prior Publication Data
US 2003/0196750 A1    Oct. 23, 2003

(30) Foreign Application Priority Data
Apr. 23, 2002  (JP) .............................. 2002-120529

(51) Int. Cl.
   *B32B 31/28*    (2006.01)
   *B29C 65/16*    (2006.01)
   *B23K 26/00*    (2006.01)

(52) U.S. Cl. .............................. 156/272.8; 156/275.1; 156/290; 156/293; 156/308.4; 156/309.6

(58) Field of Classification Search ............ 156/272.2, 156/272.8, 275.1, 290, 293, 308.4, 309.6, 156/581; 210/348, 454, 358, 545; 219/121.6, 219/121.63, 121.64, 121.65, 121.66
See application file for complete search history.

(56) References Cited

U.S. PATENT DOCUMENTS

| 4,636,609 A | 1/1987 | Nakamata |
| 6,427,846 B1 * | 8/2002 | Graus et al. ................. 210/445 |
| 6,550,914 B1 * | 4/2003 | Kopfer ........................ 351/62 |

FOREIGN PATENT DOCUMENTS

| JP | A 8-229312 | 9/1996 |
| JP | A 2000-186635 | 7/2000 |
| JP | A 2001-246488 | 9/2001 | lp;1p* cited by examiner

*Primary Examiner*—John T. Haran
*Assistant Examiner*—Jayme L. Brown
(74) *Attorney, Agent, or Firm*—Oliff & Berridge, PLC

(57) ABSTRACT

To weld a filter made of a laser beam-transmittable fiber material to a case made of a laser beam-nontransmittable resin material by a laser beam the filter is first placed on the case; subsequently, the filter is pressurized by a jig to increase the fiber density of a welding portion; and then the welding portion is irradiated by the laser beam. In the step of increasing the fiber density, a periphery of the welding portion is pressurized by the jig to increase the fiber density of the filter in a larger area than the welding portion. Accordingly, the laser beam transmitting through the filter melts a part of the case, and the melted resin material permeates through gaps between the fibers constituting the filter, thereby welding the welding portion to the case.

5 Claims, 11 Drawing Sheets

FIG. 2

| MATERIAL CHARACTERISTICS | MATERIAL | FIBER DIAMETER (μm) | MELTING POINT (°C) | CONTENT (%) |
|---|---|---|---|---|
| FIRST FILTER (LASER BEAM-TRANSMITTABLE) | POLYESTER | 10~15 | 270 | 54 |
| | RAYON | 10~40 | 180 | 46 |
| CASE (LASER BEAM-NONTRANSMITTABLE) | PA66 | − | 265 | − |

LASER WELDING METHOD

BACKGROUND OF THE INVENTION

1. Field of the Invention

The present invention relates to a laser welding method for welding a fiber filter to a resin base member by a laser beam.

2. Description of Related Art

Some of conventional methods for welding a nonwoven filter made of fibers to a base member made of resin are disclosed in, for example, Japanese patent unexamined publications No. Hei 8-229312 and No. 2000-186635. These welding methods include a first step of placing a nonwoven filter made of polyester fibers onto a base member made of nylon (trade name), a second step of partially melting the base member, thereby allowing the melted material to permeate through the gaps between the fibers constituting the filter to weld the filter to the base member.

Each related art mentioned above adopts an ultrasonic welding method or a vibrational friction welding method. For instance, in the ultrasonic welding method, an ultrasonic oscillator is disposed near a filter and caused to emit ultrasonic waves to melt a base member, so that the melted material of the base member permeates through the gaps between fibers of the filter and cured therein. Likewise, in the friction welding method, an oscillator is disposed near a filter. It therefore can be said that the friction welding method includes similar steps to those in the ultrasonic welding method.

The conventional welding methods, however, need a step of moving the oscillator or others toward or away from the filter. It would take some time by just that much to complete welding.

In this regard, there is a laser welding method using a laser beam as the method which can eliminate the need for moving the oscillator or other devices toward a work or reduce a moving distance of the devices. In this welding method, even where a laser emission device is placed apart from a work to be irradiated, the laser beam can reach a welding portion of the work if only the laser emission device is operated to emit a laser beam to the welding portion. If this welding method is used to weld a filter to a base member, consequently, it would be possible to omit or reduce a moving time of the emission device, thereby shortening the time required for the completion of welding.

However, there is no conventional example heretofore proposed for welding a filter to a base member by use of a laser beam. It is also conceivable that the welding by the laser beam will cause problems in securing welding strength or in preventing defects such as scorches or holes in the work. Consequentially, the proposal of a practical laser welding method has been desired.

SUMMARY OF THE INVENTION

The present invention has been made in view of the above circumstances and has an object to overcome the above problems and to provide a laser welding method capable of adequately welding a filter to a base member while enhancing welding strength and preventing defects such as scorches and holes.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a laser welding method for welding a fiber filter to a resin base member by a laser beam, the method including the steps of: placing the filter made of a laser beam-transmittable fiber material on the base member made of a laser beam-nontransmittable resin material; increasing the fiber density of a welding portion of the filter; and irradiating the laser beam to the welding portion; wherein the base member will partially be melted by the laser beam transmitting through the filter and a melted material of the base member will permeate through gaps between the fibers constituting the filter so that the welded portion is joined to the base member.

According to another aspect of the invention, there is provided a laser welding method for welding a fiber filter to a resin base member by a laser beam, the method including the steps of: placing the filter formed of a nonwoven fabric made of a laser beam-transmittable fiber material on the base member made of a laser beam-nontransmittable resin material; pressurizing a welding portion of the filter by a jig having a slit to increase the fiber density of the welding portion; and irradiating the laser beam to the welding portion through the slit of the jig; wherein the base member will partially be melted by the laser beam transmitting through the filter and a melted material of the base member will permeate through gaps between the fibers of the filter so that the welded portion is joined to the base member.

Furthermore, according to another aspect, the present invention provides a canister provided with the base member and the filter welded by any one of the laser welding methods described above.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 2 is a table showing a comparison of the material characteristics of a case and a first filter;

DETAILED DESCRIPTION OF THE PREFERRED EMBODIMENTS

[First Preferred Embodiment]

A detailed description of a first preferred embodiment of a laser welding method embodying the present invention will now be given referring to the accompanying drawings. In the present embodiment, this laser welding method is adopted for the manufacture of a canister.

Figure 1:
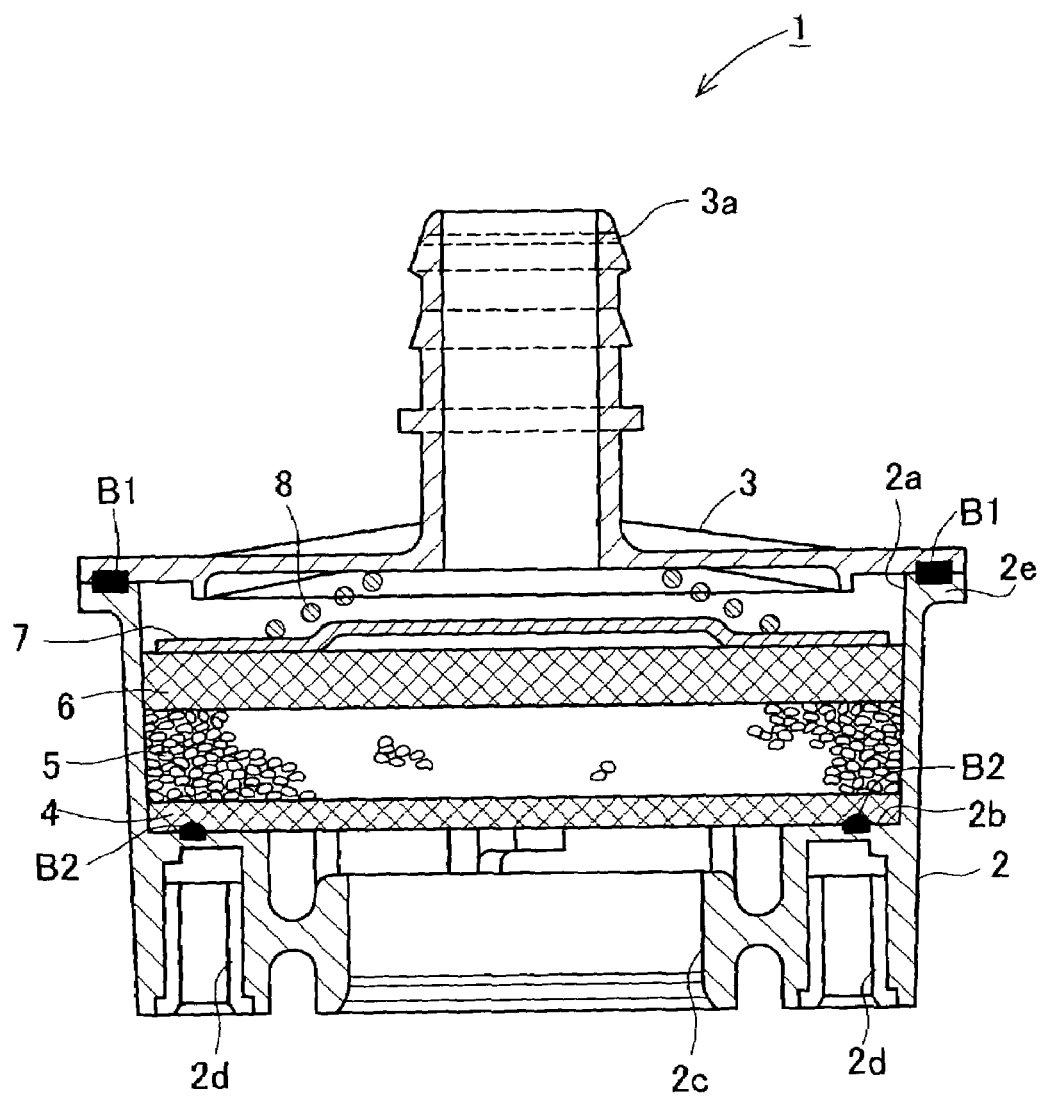
FIG. 1 is a sectional view of a canister in a first embodiment.

FIG. 1 is a sectional view of a canister 1 in the present embodiment. This canister 1 is provided with a substantially cylindrical case 2 and a cover 3 which covers the case 2. The case 2 contains a first filter 4, charcoal 5, a second filter 6, a plate 7, and a spring 8.

The case 2, which corresponds to a base member of the invention, is made of a laser beam-nontransmittable resin material. In the present embodiment, for example, "PA66 (trade name: 66-nylon)" is used as the laser beam-nontransmittable resin material. The melting point of PA66 is 265° C. The case 2 includes an upper opening 2a, an inside shoulder 2b, a lower opening 2c, and a plurality of female screw holes 2d arranged around the lower opening 2c. A flange 2e is also formed on the periphery of the upper opening 2a.

The cover 3 is set to cover the upper opening 2a of the case 2 and has a circumferential welding portion B1 which is laser-welded to the flange 2e. The cover 3 includes a pipe joint 3a. The cover 3 is made of a laser beam-transmittable resin material. In the present embodiment, for example, "PA66" is used as the laser beam-transmittable resin material.

The first filter 4, which corresponds to a filter of the invention, is made of a laser beam-transmittable fiber material. This laser beam-transmittable fiber material in the present embodiment is for example a mixture of "polyester" fibers and "rayon" fibers which are formed in intertwining relation into a nonwoven fabric. With regard to the polyester fibers, the fiber diameter is 10 $\mu$m to 15 $\mu$m, the melting point is 270° C., and the polyester content in the mixture is 54%. With regard to the rayon fibers, the fiber diameter is 10 $\mu$m to 40 $\mu$m, the melting point is 180° C., and the rayon content in the mixture is 46%. The first filter 4 has a circumferential welding portion B2 which is laser-welded to the inside shoulder 2b of the case 2. FIG. 2 is a table showing a comparison of the material characteristics of the case 2 and the first filter 4.

The charcoal 5 is used to adsorb evaporated fuel of gasoline. In the present embodiment, "BAX1100" is used as the material of charcoal 5. The charcoal 5 is put in layers having a predetermined thickness on the first filter 4.

The second filter 6 is formed of a nonwoven fabric which is thicker than the first filter 4. This nonwoven fabric in the present embodiment is for example "urethane foam". The second filter 6 is set on the charcoal 5.

The plate 7 is placed on the second filter 6. This plate 7 in the present embodiment is made of for example "punching metal". The spring 8 is arranged between the cover 3 and the plate 7 to press the plate 7 with the urging force against the charcoal 5. The spring 8 is made of for example "SWPA".

The canister 1 having the above structure is manufactured in accordance with the following steps. At first, the first filter 4 is laser-welded to the inside shoulder 2b of the case 2 and fixed to the case 2.

Secondly, the charcoal 5 is put in layers on the first filter 4 and then the second filter 6 is placed on the charcoal 5.

In the next step, the plate 7 is put on the second filter 6, and then the cover 3 is set on the second filter 2 after the spring 8 is placed between the plate 7 and the cover 3.

After that, the flange 2e of the case 2 and the circumferential portion of the cover 3 are laser-welded to fix the cover 3 to the case 2. Consequently, the canister 1 shown in FIG. 1 is completed.

Next, the laser welding method for welding the first filter 4 to the inside shoulder 2b of the case 2 will be explained in detail.

Figure 3:
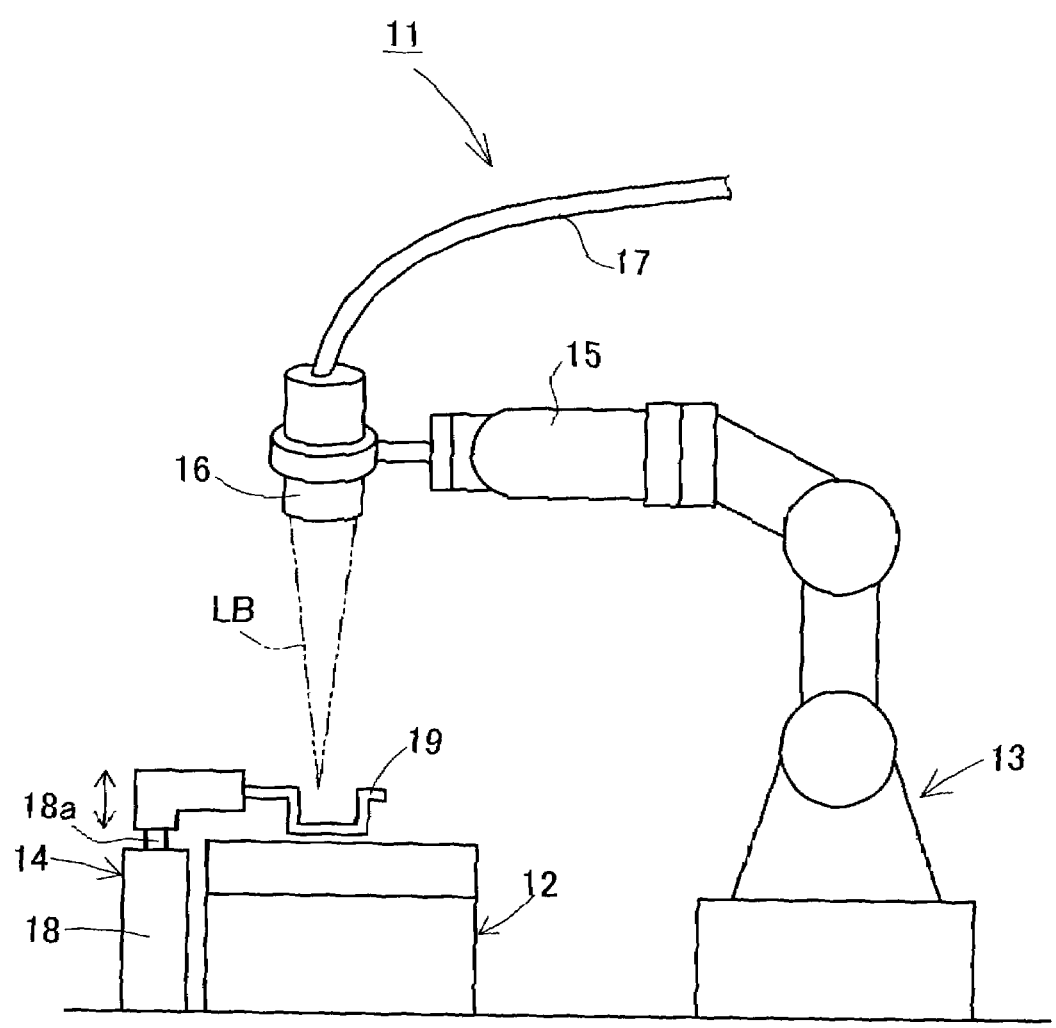
FIG. 3 is a schematic structural view of a laser welding apparatus used in a laser welding method according to the invention.

FIG. 3 is a schematic structural view of a laser welding apparatus 11 used for this laser welding method. This apparatus 11 is provided with a work table 12, a robot 13, and a compression unit 14, the robot 13 and the compression unit 14 being installed on both sides of the table 12.

The work table 12 is used for setting thereon the case 2 as a work. The robot 13 includes a multi-articulated arm 15. At an end of this arm 15, a laser emission device 16 is attached. This emission device 16 is internally provided with an optical system for emitting energy (a laser beam LB) delivered from an energy generator (a laser source) not shown through an optical fiber 17 to a work (the case 2) on the work table 12. As this energy generator, for example, a diode laser (a semiconductor laser) is used. In the present embodiment, the laser beam LB to be emitted through the emission device 6 is an infrared laser beam of 500 W and the spot diameter of the laser beam LB is set at for example about 3 mm to about 4 mm.

Figure 5:
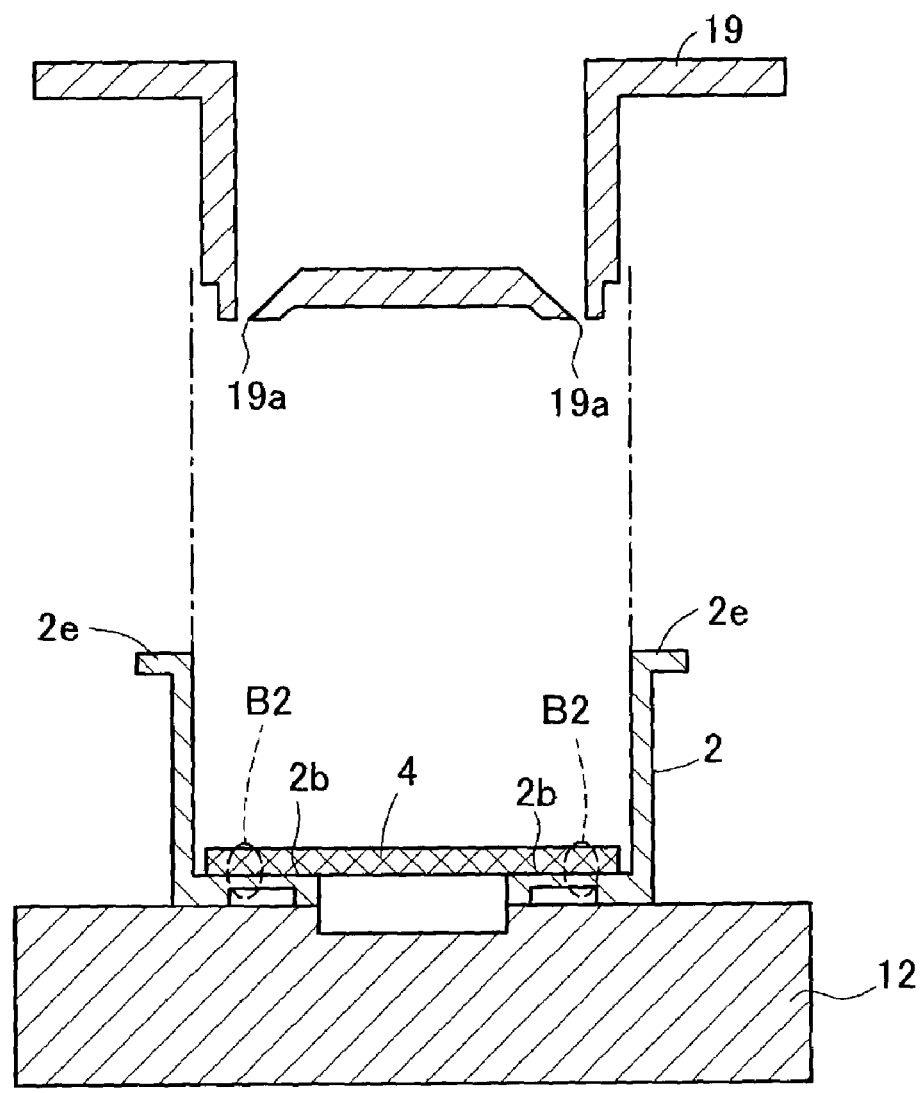
FIG. 5 is a sectional view for explaining another step of the laser welding method.

The compression unit 14 is used to press the first filter 4 against the inside shoulder 2b of the case 2. This unit 14 includes a hydraulic or pneumatic cylinder 18 having a cylinder rod 18a, and a jig 19 attached to an end of the cylinder rod 18a. Expansion and contraction of the cylinder rod 18a causes the jig 19 to move toward or apart from the work table 12. As shown in FIG. 5, the jig 19 is used to apply pressure on the periphery of the welding portion B2 of the first filter 4. The jig 19 is formed with a slit 19a through which the laser beam LB is irradiated to the welding portion B2. This slit 19a is designed to have a smaller width, e.g., 2 mm, than the spot diameter of the laser beam LB.

The laser welding of the first filter 4 to the inside shoulder 2b of the case 2 is conducted in the following steps by use of the above mentioned laser welding apparatus 11.

Figure 4:
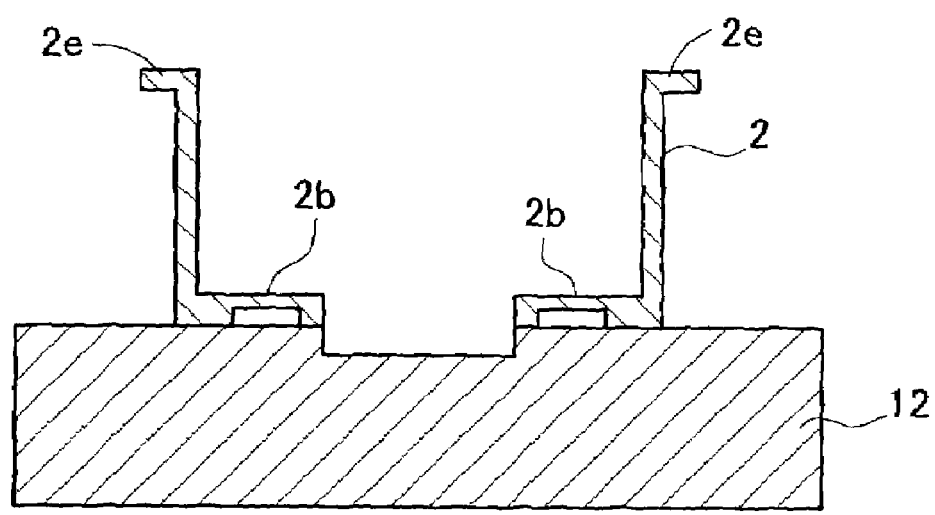
FIG. 4 is a sectional view for explaining a step of the laser welding method.

In a first step, the case 2 is first put and fixed on the work table 12, as shown in FIG. 4.

In a second step, the first filter 4 is placed on the inside shoulder 2b of the case 2, as shown in FIG. 5. At this time, the jig 19 of the compression unit 14 is disposed above the case 2.

Figure 6:
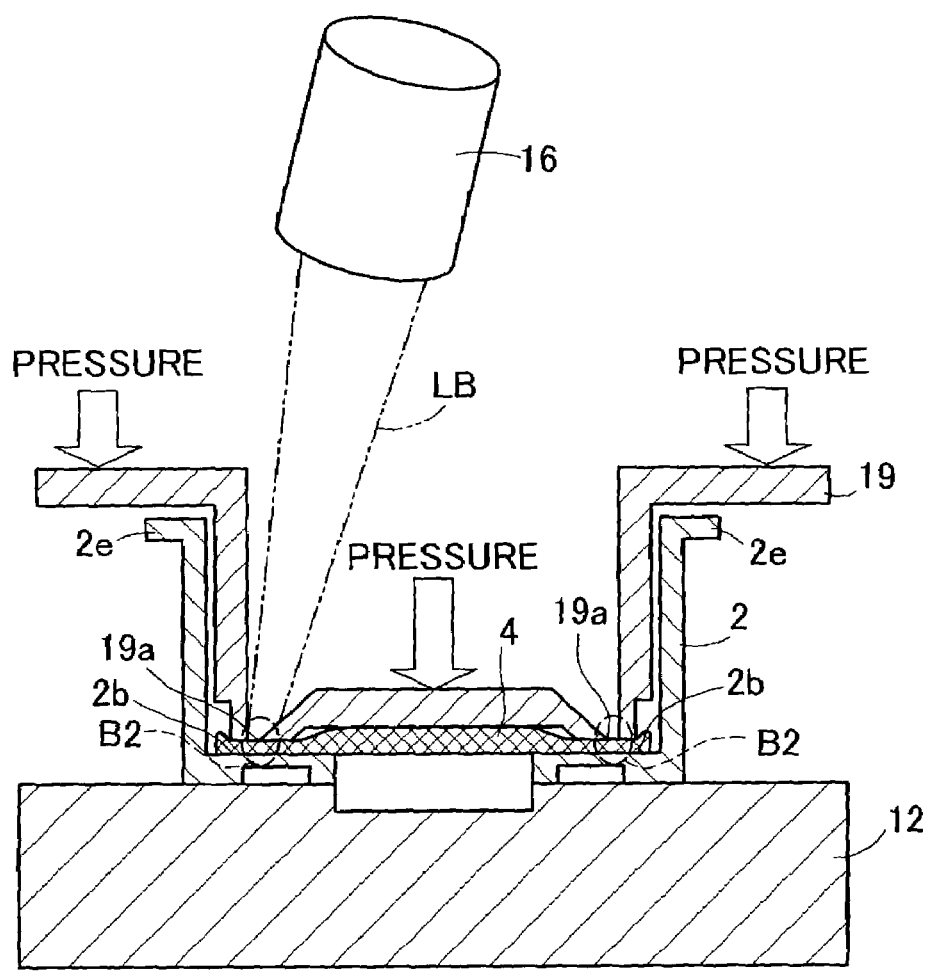
FIG. 6 is a sectional view for explaining another step of the laser welding method.

In a third step, as shown in FIG. 6, the jig 19 of the compression unit 14 is moved downward onto the first filter 4 and pressurized to press the periphery of the welding portion B2 of the first filter 4 against the inside shoulder 2b, thereby compressing the welding portion B2 and its periphery to increase the fiber density of the first filter 4. That is, the fiber density of the first filter 4 is increased in a slightly larger area than the welding portion B2. In the present embodiment, the jig 19 is operated to compress the first filter 4 so that the filter thickness of 3 mm is reduced to 0.5 mm.

In a fourth step, sequentially, the laser beam LB is irradiated from the emission device 16 to the welding portion B2 of the first filter 4. At this time, the first filter 4 is continuously compressed in the same manner as in the third step. In the present embodiment, by universal manipulation of the arm 15 of the robot 13, the laser beam LB from the laser emission device 16 can circumferentially be irradiated to the first filter 4.

It is to be noted that the emission device 16 illustrated in FIG. 6 is positioned near the jig 19, but it is merely for drawing convenience. Actually, the emission device 16 is disposed relatively apart from the jig 19. The position of the emission device 16 is adjustable by selection of a condensing lens of the optical system.

Figure 7:
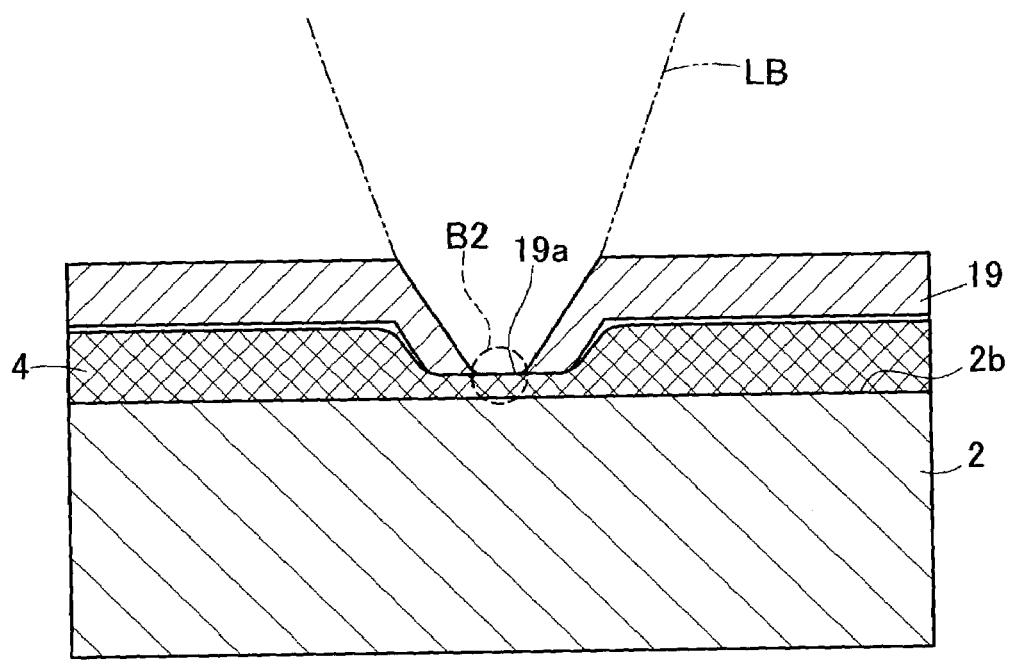
FIG. 7 is an enlarged sectional view for explaining another step of the laser welding method.
Figure 8:
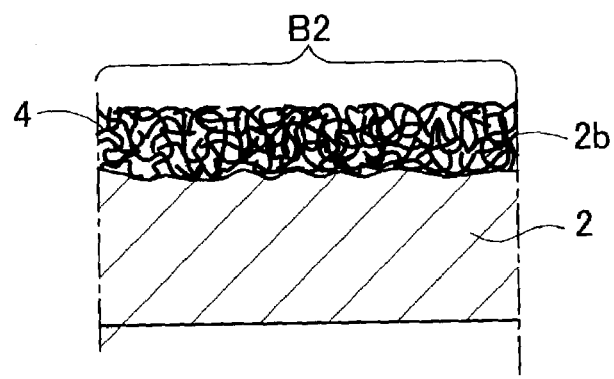
FIG. 8 is an enlarged sectional view showing a welding portion of the first filter.

In the third step, as shown in FIG. 7, a slightly larger area in the first filter 4 than the welding portion B2 is pressurized to increase the fiber density. More specifically, the periphery of the welding portion B2 is compressed against the inside shoulder 2b by the jig 19 so that the welding portion B2 is indirectly compressed. Thus, the welding portion B2 and its periphery in the first filter 4 are compressed and therefore the fiber density of the welding portion B2 of the first filter 4 is increased as shown in FIG. 8.

As shown in FIGS. 6 and 7, when the laser beam LB passing through the slit 19a of the jig 19 transmits through the first filter 4, the surface of the inside shoulder 2b of the case 2 is thereby heated and melted. The melted material of the case 2 is allowed to permeate through the gaps between fibers constituting the welding portion B2 of the first filter 4, thereby welding the welding portion B2 to the inside shoulder 2b.

According to the above mentioned laser welding method, the first filter 4 is put on the inside shoulder 2b of the case 2 and then the fiber density of the welding portion B2 of the filter 4 is increased. Accordingly, the thermal conductivity of the welding portion B2 is increased, which enhances the heat dissipation property of the filter 4. The contact area of the welding portion B2 with the melted material of the case 2 is also increased. This can enhance the welding strength of the first filter 4 to the inside shoulder 2b of the welding portion B2. The increased fiber density of the welding portion B2 of the first filter 4 can improve the thermal conductivity of the fibers of the welding portion B2, thereby enhancing the heat dissipation of the welding portion B2. Consequently, it is possible to prevent the filter 4 from being scorched or holed by the melting heat of the inside shoulder 2b. Furthermore, the first filter 4 itself is made of a laser beam-transmittable fiber material, which can transmit the laser beam LB. Accordingly, the fiber itself is not heated during transmission of the laser beam, so that the filter 4 can be prevented from being scorched or holed by the laser beam LB. In other words, the first filter 4 can adequately be welded to the inside shoulder 2b of the case 2 while the welding strength can be enhanced and the defects such as scorches and holes can be prevented.

Figure 9:
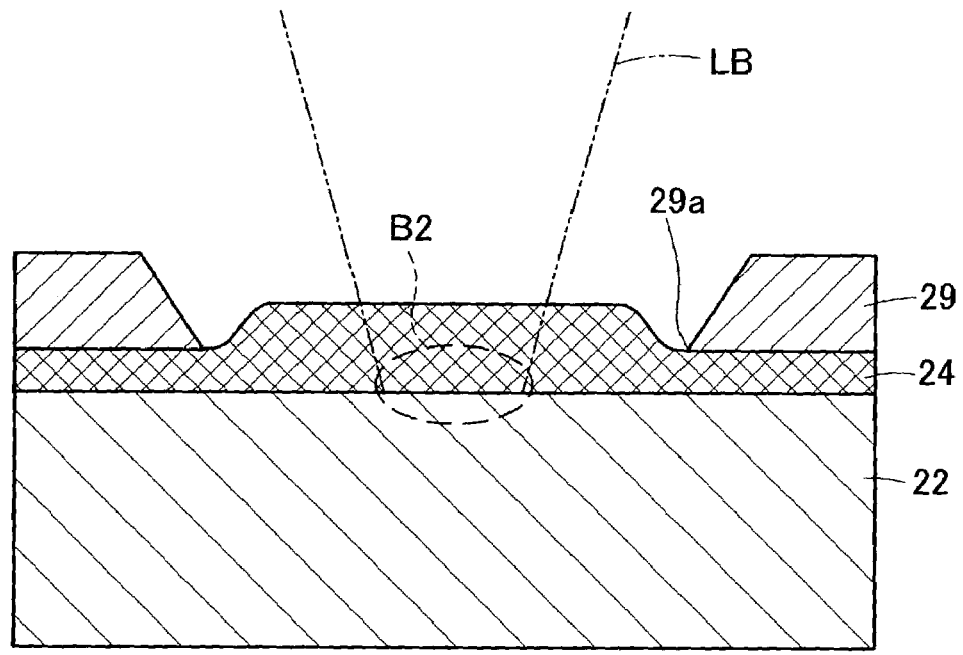
FIG. 9 is an enlarged sectional view for explaining a step of a laser welding method in a comparative example.
Figure 10:
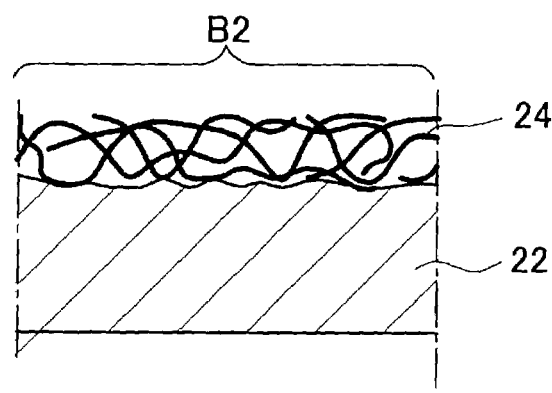
FIG. 10 is an enlarged sectional view showing a welding portion of a filter in the comparative example.

The above operations and effects can result from the pressurization and compression of the welding portion B2 of the first filter 4 by the jig 19. For instance, FIG. 9 shows a comparative example in which a jig 29 having a relatively larger slit 29a is used to press a filter 24 against a case 22. In this case, the periphery of a welding portion B2 is not compressed. As shown in FIG. 10, accordingly, the fiber density of the welding portion B2 is not increased and the fibers constructing the welding portion B2 remain rough. When the laser beam LB is irradiated to the welding portion B2 in this state, the welding portion B2 will be scorched or holed because of the low thermal conductivity. In this case, furthermore, the contact area of the fibers with the melted material of the case 22 is small and therefore the welding strength of the filter 24 to the case 22 is low. These disadvantages can be avoided according to the laser welding method in the present embodiment.

In the present embodiment, the fiber density of the first filter 4 is increased in a slightly larger area than the welding portion B2, which makes it possible to reduce a thermal influence on the portion other than the welding portion B2, namely, the portion having a low fiber density. It is consequently possible to surely prevent the portions other than the welding portion B2 from being scorched or holed.

In the present embodiment, the welding portion B2 and the periphery thereof in the first filter 4 are pressurized and compressed against the inside shoulder 2b of the case 2, thereby increasing the contact area of the welding portion B2 and its periphery with respect to the inside shoulder 2b. Consequently, the joining strength between the first filter 4 and the inside shoulder 2b can further be enhanced.

Figure 11:
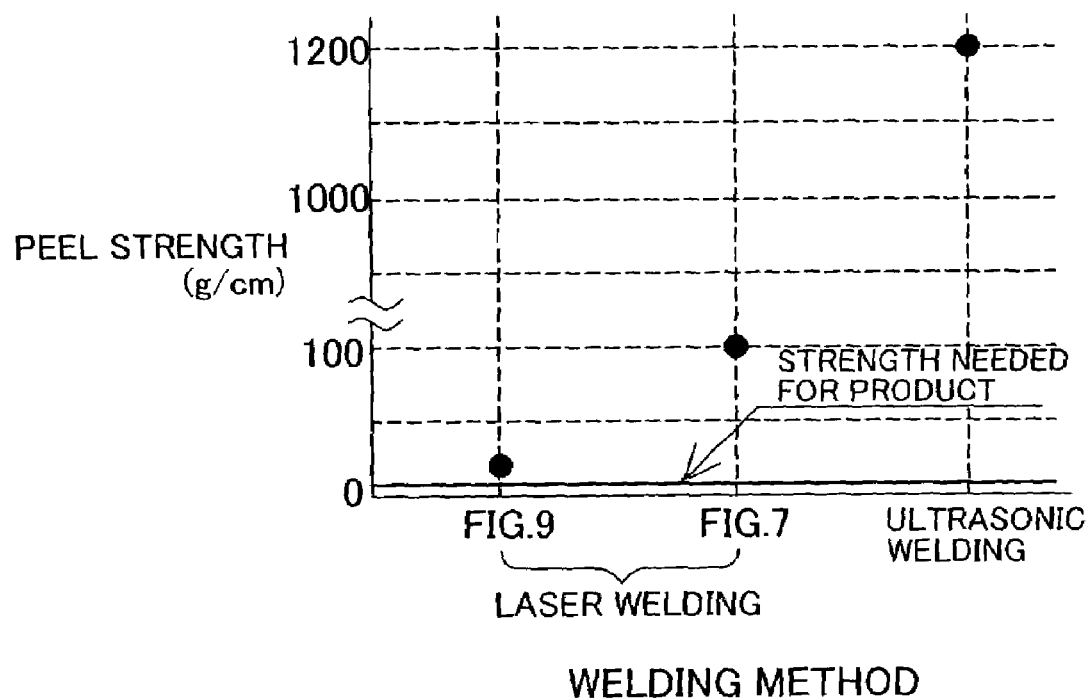
FIG. 11 is a graph showing a relationship between the welding method and joining strength of the filter.

FIG. 11 is a graph showing a relationship between each filter welding method and the joining strength. In FIG. 11, the lateral axis indicates the types of welding methods and the vertical axis indicates the peel strength related to the joining strength. In the lateral axis, there are shown the laser welding examples shown in FIG. 9 (the comparative example) and FIG. 7 (the present embodiment) respectively and the ultrasonic welding example.

Figure 12:
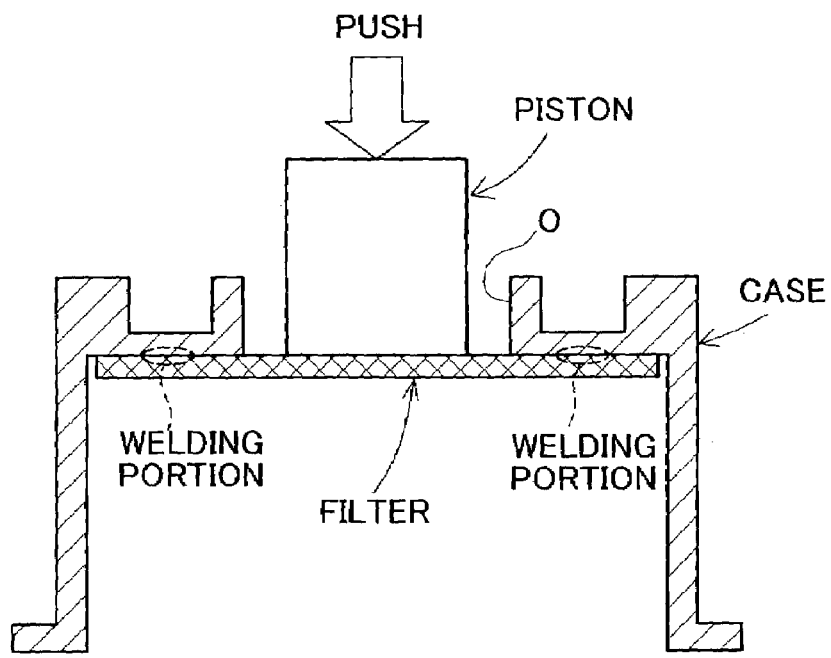
FIG. 12 is an explanatory view of a method for measuring peel strength.

Measurements of the peel strength were carried out in the following manner. Specifically, samples were prepared by welding the filters to the cases according to the above three types of welding methods. In each sample, as shown in FIG. 12, the filter is pressed by a piston from the lower opening side of the case (namely, from above in FIG. 12). The conditions of measurements were that the inner diameter of the opening O (corresponding to the lower opening 2c in FIG. 1) of the case was 38 mm, the outer diameter of the piston was 36 mm, and the pressing speed of the piston was 5 mm/min.

As shown in FIG. 11, the peel strength in the laser welding shown in FIG. 9 was about 20 g/cm, that in the laser welding shown in FIG. 7 was about 100 g/cm, and that in the ultrasonic welding was about 1200 g/cm. In the ultrasonic welding, the melted resin of the case permeated in the filter throughout the thickness, so that the peel strength was determined at a high value approximately equal to the strength of the filter itself. In the laser welding, on the other hand, the melted resin permeated in the filter at only a portion (about 100 $\mu$m) near the contact surface with the melted resin, so that the peel strength was lower than that in the ultrasonic welding. However, the laser welding in the present embodiment shown in FIG. 7 could provide the peel strength (welding strength) sufficient to be practically used.

In the present embodiment adopting the laser welding method, there is no need to move the emission device 16 toward and apart from the welding portion B2 before and after the step of irradiating the laser beam LB to the welding portion B2. In other words, differently from the conventional ultrasonic welding method in which the oscillator was needed moving toward and apart from the filter during welding, the present invention can eliminate the need for moving the laser emission device 16. Thus, it is possible to reduce the time needed for completing the welding by just that much.

Next, the laser welding of the case 2 and the cover 3 is explained below. In the present embodiment, the case 2 is made of a laser beam-nontransmittable resin material and the cover 3 is made of a laser beam-transmittable resin material. Accordingly, as in the case of the case 2 and the filter 4, the laser welding can be adopted for laser-welding the cover 3 to the case 2.

Figure 13:
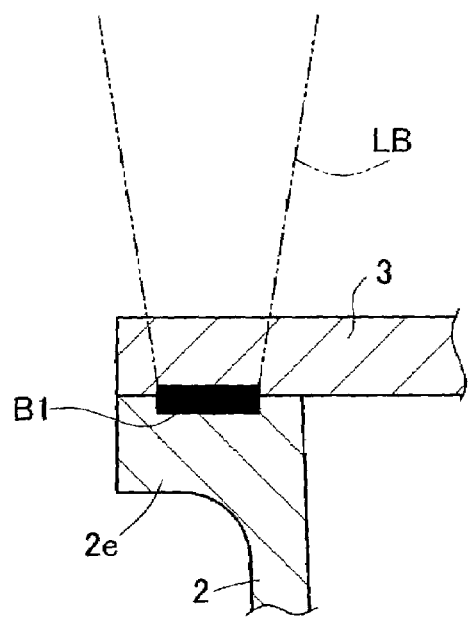
FIG. 13 is an enlarged sectional view for explaining a laser welding method for joining a case and a cover.

More specifically, as shown in FIG. 13, the laser beam LB is irradiated to the cover 3 placed on the flange 2e of the case 2 along the circumference of the cover 3 so that the surface of the flange 2e is partially melted by the laser beam LB transmitting through the cover 3. The melted resin of the flange 2e is then joined to the cover 3, thereby welding the welding portion B1 of the cover 3 to the flange 2e of the case 2.

In the present embodiment, by universal operation of the arm 15 of the robot 13, the laser beam LB can be irradiated along the circumference of the cover 3. In the present embodiment, following the welding between the case 2 and the first filter 4, the laser welding is further adopted for the welding between the case 2 and the cover 3. Consequently, for the manufacture of the canister 1, the laser welding can be adopted for all the welding operations, so that manufacturing equipment and manufacturing steps can be simplified and the necessary time can be reduced as compared with the case where plural welding methods of various types are adopted.

In the present embodiment, the above mentioned laser welding method is adopted for the manufacture of the canister 1 and therefore this manufactured canister 1 is provided with the case 2 and the first filter 4 welded according to the above method. The canister 1 can accordingly have the operations and effects according to the above laser welding method. Consequentially, the first filter 4 can be held in a securely welded state to the case 2 for a long time and in this connection the durability of the canister 1 can be improved. Furthermore, the time needed for completing the laser welding can be reduced, thereby reducing the time needed for manufacturing the canister 1.

[Second Embodiment]

Next, explanation is made on a second embodiment of the laser welding method of the present invention, which is adopted to manufacture a canister.

It is to be noted that like elements in each of the following embodiments to those in the first embodiment are given like numerals and the explanation thereof is omitted. The following embodiments are explained with a focus on differences from the first embodiment.

Figure 14:
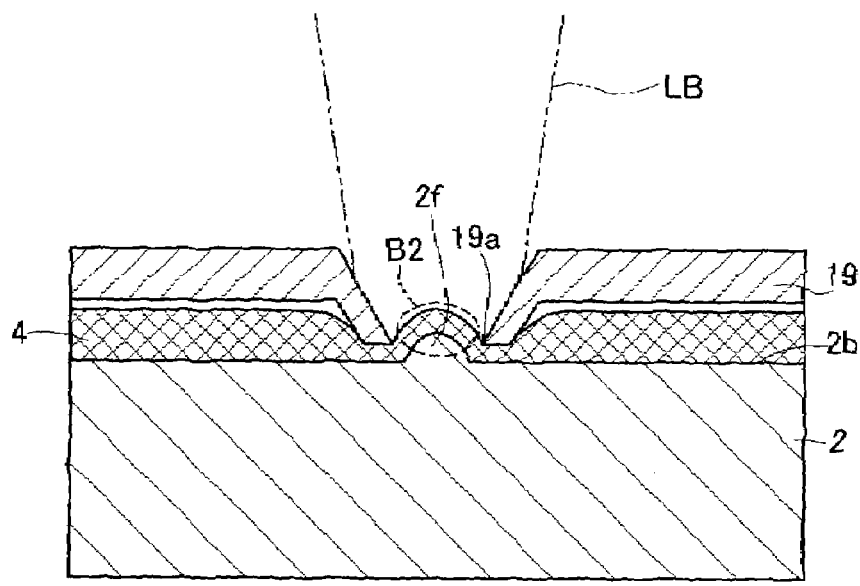
FIG. 14 is an enlarged sectional view for explaining a step in a laser welding method in a second embodiment.

A different point of this second embodiment from the first embodiment in relation to the laser welding of the case 2 and the first filter 4 is in that a protrusion 2f is provided on the surface of the inside shoulder 2b of the case 2 in correspondence with the welding portion B2 of the first filter 4 as shown in FIG. 14.

More specifically, in a step of increasing the fiber density of the first filter 4 according to the laser welding method in the second embodiment, the periphery of the welding portion B2 is pressurized and compressed against the inside shoulder 2b of the case 2 by means of the jig 19, thereby indirectly compressing the welding portion B2 while directly pressurizing and compressing the welding portion B2 from the case 2 side by the protrusion 2f of the inside shoulder 2b.

According to the laser welding method in the second embodiment, the welding portion B2 and its periphery are pressurized and compressed against the inside shoulder 2b, so that the contact area of the welding portion B2 and its periphery with respect to the inside shoulder 2b is increased. Since the welding portion B2 is directly compressed from the case 2 side, the joining degree between the welding portion B2 and the inside shoulder 2b is also increased. Consequently, the laser welding method in the second embodiment can more largely increase the joining strength between the first filter 4 and the inside shoulder 2b as compared with that in the first embodiment. In other words, the laser welding method in the second embodiment can reduce output energy (output power) of the laser beam to be emitted from the emission device 16 to about one-fifth the output energy in the first embodiment in order to provide the joining strength substantially equal to that in the first embodiment. Thus, energy consumption can be reduced. Other operations and effects are similar to those in the first embodiment.

[Third Embodiment]

Next, explanation is made on a third embodiment of the laser welding method of the present invention, which is adopted to manufacture a canister.

Figure 15:
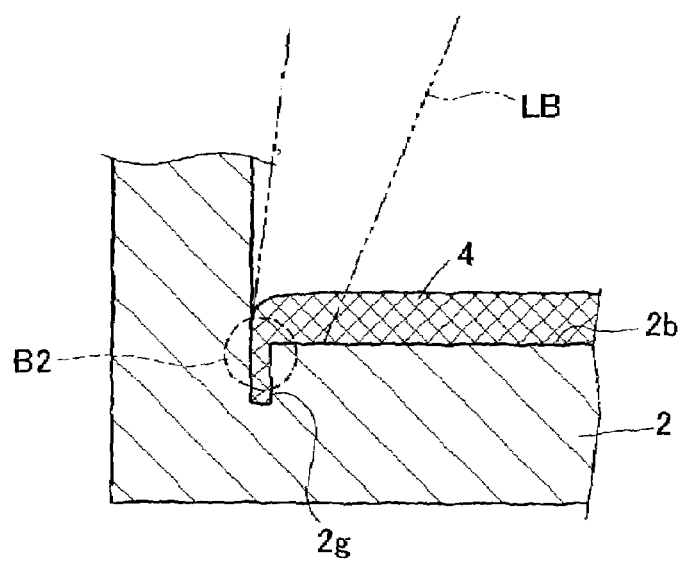
FIG. 15 is an enlarged sectional view for explaining a step in a laser welding method in a third embodiment.

A different point of this third embodiment from the first and second embodiments in relation to the laser welding of the case 2 and the first filter 4 is in that a groove 2g is provided in the case 2 at a corner of the inside shoulder 2b in correspondence with the welding portion B2 of the filter 4 as shown in FIG. 15 and the peripheral edge of the first filter 4 is wedged in the groove 2g. More specifically, in a step of increasing the fiber density of the first filter 4 in the laser welding method in the third embodiment, the welding portion B2 and its periphery are inserted in a tucked state into the groove 2g of the inside shoulder 2b of the case 2 so that the welding portion B2 and its periphery are compressed inside the groove 2g.

In the third embodiment, since the welding portion B2 and its periphery are compressed in the groove 2g of the inside shoulder 2b, the contact area of the welding portion B2 and its periphery with respect to the inside shoulder 2b can be increased without the use of the above mentioned jig 19 and others. Thus, the third embodiment can provide the same effects as in the case of the compression by the jig 19 and others in the first embodiment.

In the third embodiment, the tucking operation is performed after the case 2 is set on the work table 12. Alternatively, the peripheral edge of the first filter 4 may be previously inserted (folded) in a tucked state into the groove 2g of the inside shoulder 2b.

The present invention may be embodied in other specific forms without departing from the spirit or essential characteristics thereof. For instance, the following alternatives can be adopted.

In the first and second embodiments, the jig 19 is partially formed with the slit 19a in correspondence with the welding portion B2 of the first filter 4 to allow the laser beam LB to pass through the slit 19a. As an alternative, the jig itself may be made of a laser beam-transmittable material and the slit may be omitted so that the jig directly presses the welding portion of the filter. In this case, the joining strength of the welding portion can be more increased.

In the first and second embodiments, the jig 19 may be made of a material having good thermal conductivity to promote heat dissipation of the first filter 4. In this case, the cooling effect of the first filter 4 can be enhanced, which makes it possible to surely prevent the filter 4 from being scorched or holed by heat of the laser beam.

In the first and second embodiments, the step of increasing the fiber density of the welding portion B2 of the first filter 4 is provided as a pre-step of the laser irradiation step. Alternatively, under condition that the welding portion of the filter is previously constructed with a higher fiber density than other portions, a step of placing and lightly pressing the filter on the inside shoulder of the case by the jig may be provided as a pre-step of the laser irradiation step. Furthermore, the step of increasing the fiber density of the welding portion as compared with other portions may be achieved by compressing and hardening only the welding portion of the filter. Alternatively, the filter may be constructed to entirely have a uniform thickness with only the welding portion previously having the higher fiber density than other portions. These cases can also produce the same operations and effects as those in the first and second embodiments.

In each of the above embodiments, the laser welding method of the present invention is adopted to manufacture the canister 1 by welding the case 2 and the first filter 4. The present invention can be adopted to not only the manufacture of the canister but also manufactures of various devices if a filter made of a fiber material is welded to a base member made of a resin material by a laser beam.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A laser welding method for welding a fiber filter to a resin base member by a laser beam, the method including the steps of:

placing the filter formed of a nonwoven fabric made of a laser beam-transmittable fiber material on the base member made of a laser beam-nontransmittable resin material;

pressurizing a welding portion of the filter by a jig having a slit to increase the fiber density of the welding portion; and irradiating the laser beam to the welding portion through the slit of the jig;

wherein the base member will partially be melted by the laser beam transmitting through the filter and a melted material of the base member will permeate through gaps between the fibers of the filter so that the welded portion is joined to the base member.

2. The laser welding method according to claim 1, wherein the step of pressurizing a welding portion is performed to increase the fiber density of the filter in a slightly larger area than the welding portion.

3. The laser welding method according to claim 2, wherein the step of pressurizing a welding portion is performed to press a periphery of the welding portion against the base member to thereby indirectly compress the welding portion.

4. The laser welding method according to claim 2, wherein the step of pressurizing a welding portion is performed to press a periphery of the welding portion against the base member to thereby indirectly compress the welding portion and directly compress the welding portion from the base member side by a protrusion.

5. The laser welding method according to claim 2, wherein the step of pressurizing a welding portion is performed to insert the welding portion and a periphery of the welding portion in a tucked state into a recess previously formed in the base to thereby compress the welding portion and the periphery of the welding portion inside the recess.

* * * * *